(12) United States Patent
Go

(10) Patent No.: US 6,307,592 B1
(45) Date of Patent: Oct. 23, 2001

(54) APPARATUS FOR CONVERTING THE FORMAT OF VIDEO SIGNALS BASED ON FREQUENCY AND COMPOSITION RATIO

(75) Inventor: Dong-jin Go, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/349,257

(22) Filed: Jul. 8, 1999

(30) Foreign Application Priority Data

Jul. 10, 1998 (KR) .................................................. 98-27882

(51) Int. Cl.[7] .................................................... H04N 7/01
(52) U.S. Cl. ............................................ 348/453; 348/450
(58) Field of Search ...................................... 348/453, 450, 348/441, 458, 448, 459, 581; 345/153, 154

(56) References Cited

U.S. PATENT DOCUMENTS 5,784,116 * 7/1998 Pan et al. .............................. 348/453
5,905,536 * 5/1999 Morton et al. ........................ 348/441
5,982,432 * 11/1999 Uenoyama et al. ................... 348/391
5,995,154 * 11/1999 Heimburger .......................... 348/448

* cited by examiner

Primary Examiner—Victor R. Kostak
(74) Attorney, Agent, or Firm—Sughrue, Mion, Zinn, Macpeak & Seas, PLLC

(57) ABSTRACT

A video signal format converting apparatus is provided for doubling a horizontal/vertical frequency, and converting the composition ratio of a luminance signal and color-difference signals, by which both horizontal/vertical frequency-converted and frequency-unconverted input signals can be processed. In this apparatus, external input signals not yet scan frequency-doubled and those scan frequency-doubled are controlled to be all processed. Thus, various input signals can be processed, and an external input signal not yet scan frequency-doubled can be processed even without installing a special scan conversion device.

14 Claims, 2 Drawing Sheets

APPARATUS FOR CONVERTING THE FORMAT OF VIDEO SIGNALS BASED ON FREQUENCY AND COMPOSITION RATIO

BACKGROUND OF THE INVENTION

1. Field of the Invention

The present invention relates to an apparatus for processing a TV video signal, and more particularly, to a video signal format converting apparatus for doubling a horizontal/vertical frequency, and converting the composition ratio of a luminance signal to a color-difference signal, by which both horizontal/vertical frequency-converted and frequency-unconverted input signals can be processed.

2. Description of the Related Art

In a conventional digital TV signal processing method, flickering phenomenon or resolution is improved by converting a digital TV signal into a video signal whose vertical frequency is doubled by double scan conversion, or converting the digital TV signal into a video signal whose horizontal frequency is doubled by progressive scan conversion.

Three signals, luminance information Y and color-difference information U and V, are included in a pixel constituting a horizontal line (scanning line) of a TV screen or the like, and are represented by certain ratios according to the amount of information in the signals. That is, when the amount of color-difference information is not reduced, the three signals are represented by the ratio of 4:4:4. When the amount of color-difference information is halved in the horizontal direction, the three signals are represented by the ratio of 4:2:2. When the amount of color-difference information is reduced to one quarter in the horizontal direction, the three signals are indicated by the ratio of 4:1:1.

In particular, in the case of 4:4:4, the amount of data in each of the luminance signal and the color-difference signals is the same, and one luminance signal and two color-difference signals correspond to one pixel. Since, there is a larger amount of data in the ratio of 4:4:4 than in the other composition ratios, the quality of the image is increased.

As shown in FIG. 1, according to the prior art, a signal decoded by a decoder 101 has a composition ratio of 4:1:1 or 4:2:2. Thus, a horizontal/vertical frequency converter 102 is needed, which doubles the horizontal/vertical frequency of the decoded signal, using a progressive scan conversion method or a double scan conversion method.

Next, a format converter 103 converts the scanning-converted video signals having a composition ratio of 4:1:1 or 4:2:2 into signals having a composition ratio of 4:4:4 to improve the image quality of the video signals, and outputs the resultant signals to a multiplexer 104.

R, G, and B analog input signals are converted into digital Y, U, and V signals, having the composition ratio of 4:4:4, by an analog-to-digital (A/D) converter 105 and a space converter 106, and the digital Y, U, and V signals are output to the multiplexer 104.

Then, the multiplexer 104 selects and outputs the converted external input signals or an internally-processed signal according to a control selection signal.

According to the prior art as described above, external R, G, and B input signals received from a personal computer or the like are progressive scan converted or double scan converted. Only a signal having a doubled horizontal or vertical frequency can be processed, whereas signals whose horizontal or vertical frequency has not been doubled cannot be processed.

SUMMARY OF THE INVENTION

To solve the above problem, it is an objective of the present invention to provide an apparatus for converting the format of a video signal, by which both a video signal having an undoubled horizontal/vertical frequency and an input video signal having a doubled horizontal/vertical frequency can be processed by determining the format of a received external video signal.

Accordingly, to achieve the above objective, there is provided an apparatus for converting decoded video signals and external input video signals R, G, and B, into signals having formats which are required by a signal processor, the apparatus comprising: an analog-to-digital (A/D) converter for converting the external input video signals into digital signals; a space converter for converting the R, G, and B digital signals output from the A/D converter into a luminance signal Y and color-difference signals U and V; a first format converter for converting the composition ratio of the Y, U, and V signals of the space converter into a Y:U:V composition ratio that is the same as the composition ratio of the decoded image signals; a first multiplexer for receiving the decoded video signals and the Y, U, and V signals output from the first format converter, and selecting and outputting one group of input signals according to a first selection control signal; a horizontal/vertical frequency converter for doubling the horizontal or vertical frequency of output signals of the first multiplexer; a second format converter for converting the composition ratio of the output signals of the horizontal/vertical frequency converter into the composition ratio of the luminance signal and the color-difference signals which is suitable for the signal processor; a second multiplexer for receiving the output signals of the second format converter and the output signals of the space converter, and selecting and outputting one group of input signals according to a second selection control signal; and a controller for generating first and second selection control signals depending on the horizontal/vertical frequency of the external input signals R, G, and B and on whether the external input signals are to be output, according to the selection of a user.

BRIEF DESCRIPTION OF THE DRAWINGS

The above objective and advantage of the present invention will become more apparent by describing in detail a preferred embodiment thereof with reference to the attached drawings in which.

DESCRIPTION OF THE PREFERRED EMBODIMENT

Figure 1:
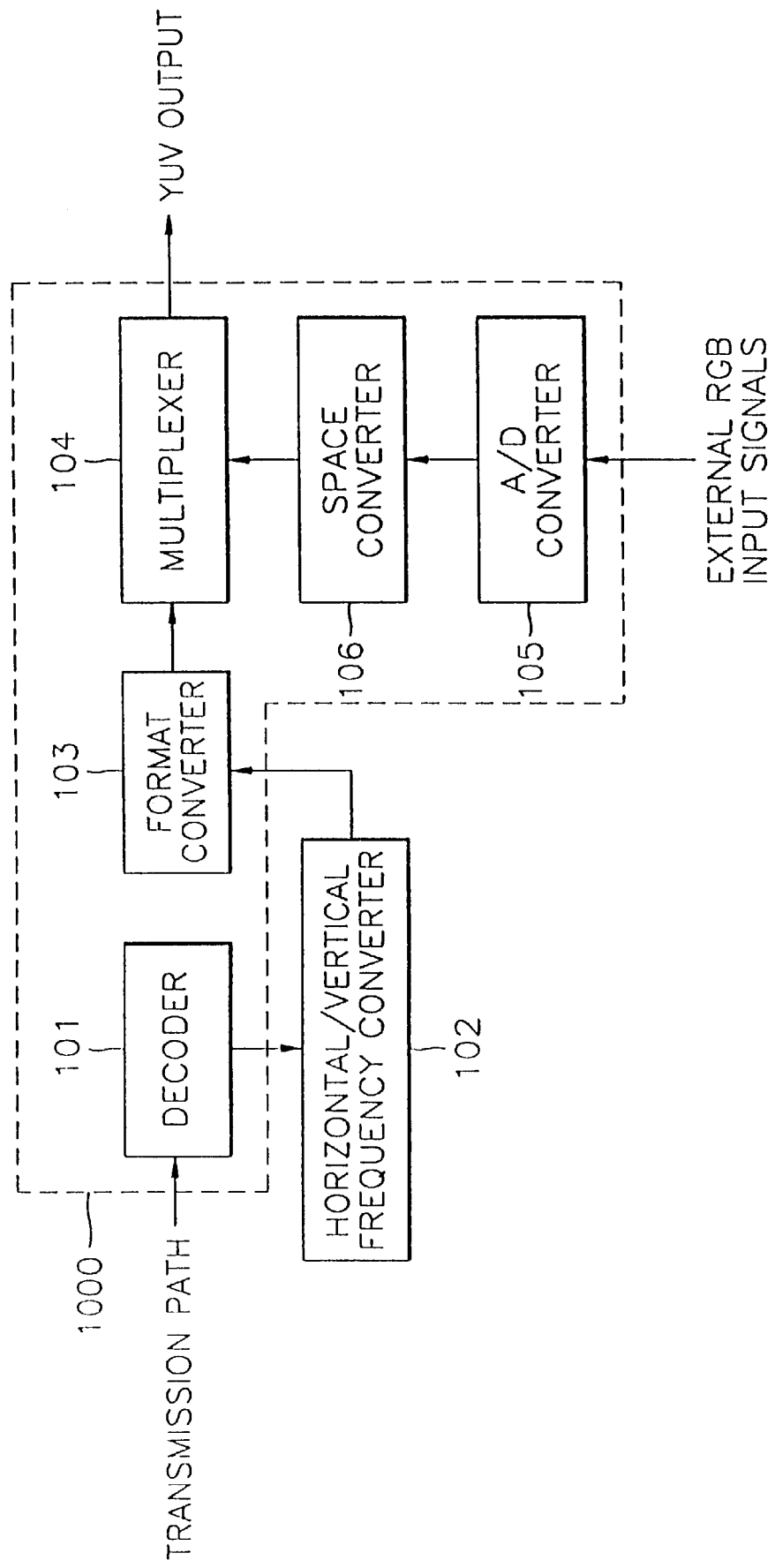
FIG. 1 is a block diagram illustrating the configuration of a conventional apparatus for converting the format of a video signal.
Figure 2:
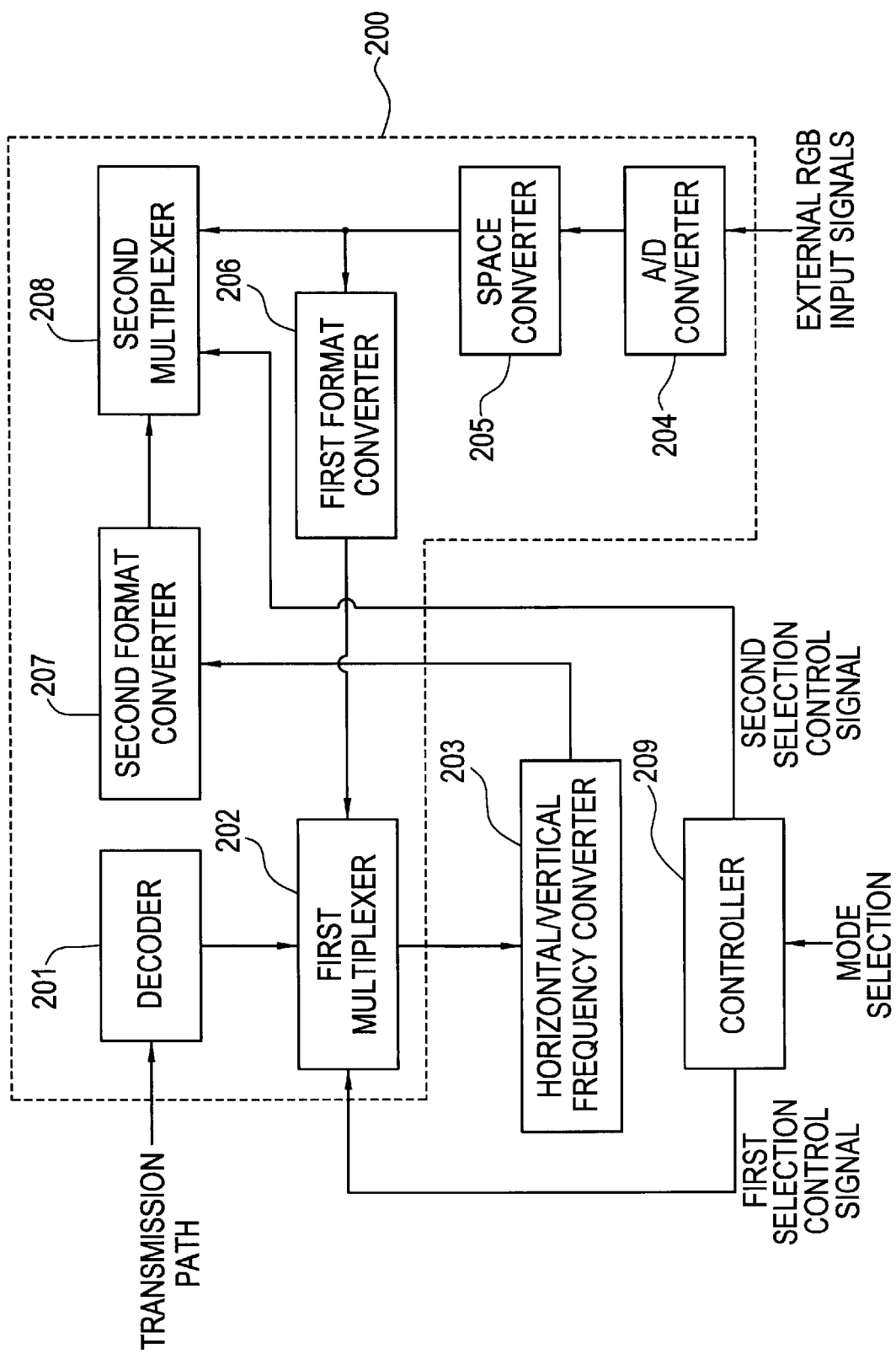
FIG. 2 is a block diagram illustrating the configuration of an apparatus for converting the format of a video signal, according to the present invention.

As shown in FIG. 2, an apparatus for converting the format of a video signal, according to the present invention, includes a decoder 201, a first multiplexer 202, a horizontal/vertical frequency converter 203, an analog-to-digital (A/D) converter 204, a space converter 205, a first format converter 206, a second format converter 207, a second multiplexer 208, and a controller 209.

The decoder 201, the first multiplexer 202, the A/D converter 204, the spacer converter 205, the first and second format converters 206 and 207, and the second multiplexer 208 constitute a signal processing integrated circuit 2000.

A modulated MPEG signal received via a transmission path is decoded by the decoder 201, and output to the first multiplexer 202 as digital Y, U, and V signals having a composition ratio of 4:1:1 or 4:2:2.

Received external R, G, and B signals are converted into digital R, G, and B signals by the A/D converter 204. The space converter 205 receives the digital R, G, and B signals, executes an algorithm for format conversion, and generates a luminance signal Y and color-difference signals U and V.

The first format converter 206 converts the composition ratio of 4:4:4 of the converted external signals Y, U, and V into the composition ratio of 4:1:1 or 4:2:2 of the signals decoded by the decoder 201, and outputs the resultant signals to the first multiplexer 202.

The first multiplexer 202 receives the signals output from the decoder 201 and the signals output from the first format converter 206, and selects only one group of signals from the two groups of received signals according to a first selection control signal generated by the controller 209. That is, when a user selects an input mode for processing the external input signals, the first selection control signal operates the first multiplexer 202 to select the signal output from the first format converter 206, and otherwise, the first selection control signal operates the first multiplexer 202 to select the signal output from the decoder 201.

The horizontal/vertical frequency converter 203 receives a signal selected by the first multiplexer 202, and converts the format by doubling the horizontal or vertical frequency of the received signal. Here, converting the format by doubling the horizontal frequency is performed by the progressive scan conversion method using interpolation, and converting the format by doubling the vertical frequency is performed by the double scan conversion method.

Double scan conversion is performed to improve flickering by inserting a field signal, interpolated using a motion vector, between field signals, and doubling the vertical frequency of a video signal to 60 (50)Hz to 120 (100)Hz in the case of an NTSC (or PAL) format.

On the other hand, progressive scan conversion is performed to improve the image quality of a video signal by inserting a line signal, interpolated using a motion vector, between the horizontal line signals of a field signal, without changing the vertical frequency of the video signal, and doubling the horizontal frequency of the video signal.

The second format converter 207 receives a video signal whose horizontal or vertical frequency is doubled by the horizontal/vertical frequency converter 203, converts the composition ratios 4:1:1 or 4:2:2 of the luminance signal Y and the color-difference signals U and V into a ratio of 4:4:4, and outputs the resultant signals to the second multiplexer 208.

The second multiplexer 208 receives the output signals of the second format converter 207 and the output signals of the space converter 205, and selects and outputs only one group of signals from the two groups of received signals according a second selection control signal from the controller 209.

That is, the second selection control signal of the controller 209 operates the second multiplexer 208 to select the output signals of the spacer converter 205 when each of the external input signals has either a doubled horizontal or vertical frequency, or both a doubled horizontal and vertical frequency in a mode selected for processing the external input signals.

However, when a mode for processing decoded internal signals is set, or when the horizontal or vertical frequency of the external input signals is not doubled by a scan conversion method in a mode set to process external input signals, the second selection control signal operates the second multiplexer 208 to select the output signals of the second format converter 207.

Not only when the external input signals are scan converted into signals each having either a doubled horizontal or vertical frequency or both a doubled horizontal and vertical frequency, but also when they are not progressive or double scan converted, the video signal output from the second multiplexer 208 is a video signal scan-converted into a signal having a doubled horizontal or vertical frequency required by a signal processor (not shown). Thus, signal processing is possible regardless of the format of the external input signals.

According to the present invention as described above, the processing of all external input signals not yet scan frequency-doubled and those scan frequency-doubled is controlled. Thus, various input signals can be processed, and the external input signal not yet scan frequency-doubled can be processed without installing a special scan conversion device.

What is claimed is:

1. An apparatus for converting decoded video signals and external input video signals R, G, and B, into signals having formats which are required by a signal processor, the apparatus comprising:

an analog-to-digital (A/D) converter for converting the external input video signals into digital signals;

a space converter operative to convert the R, G, and B digital signals output from the A/D converter into a luminance signal Y and color-difference signals U and V;

a first format converter operative to convert the composition ratio of the Y, U, and V signals of the space converter into a Y:U:V composition ratio that is the same as the composition ratio of the decoded image signals;

a first multiplexer operative to receive the decoded video signals and the Y, U, and V signals output from the first format converter, and selecting and outputting one group of input signals according to a first selection control signal;

a horizontal/vertical frequency converter operative to double the horizontal or vertical frequency of output signals of the first multiplexer;

a second format converter operative to convert the composition ratio of the output signals of the horizontal/vertical frequency converter into the composition ratio of the luminance signal and the color-difference signals which is suitable for the signal processor;

a second multiplexer operative to receive the output signals of the second format converter and the output signals of the space converter, and selecting and outputting one group of input signals according to a second selection control signal; and a controller, responsive to a mode selection signal and being operative to generate first and second selection control signals for said first and second multiplexers, respectively, depending on the horizontal/vertical frequency of the external input signals R, G, and B and on whether the external input signals are to be output.

2. The apparatus for converting the format of a video signal as claimed in claim 1, wherein the first selection control signal controls the first multiplexer to select the output signals of the first format converter in a mode for processing external input signals, and operates the first multiplexer to select the decoded video signals in a mode for processing internal signals.

3. The apparatus for converting the format of a video signal as claimed in claim 1, wherein the second selection control signal controls the second multiplexer to select the output signals of the space converter when a mode for processing external input signals is set and when each of the external input signals has either a doubled horizontal or vertical frequency or both a doubled horizontal or vertical frequency, and operates the second multiplexer to select the output signals of the second format converter when the mode for processing internal signal is set or when the horizontal or vertical frequency of the external input signals is not doubled in the mode for processing external input signals.

4. The apparatus for converting the format of a video signal as claimed in claim 1, wherein said double scan conversion is performed by inserting a field signal, interpolated using a motion vector, between field signals, and doubling the vertical frequency of a video signal.

5. The apparatus for converting the format of a video signal as claimed in claim 4, wherein the frequency is converted from 60 Hz to 120 Hz in the case of a NTSC signal.

6. The apparatus for converting the format of a video signal as claimed in claim 1, wherein said double scan conversion is performed by inserting a line segment, interpolated using a motion vector, between the horizontal line signals of a field signal, without changing the vertical frequency of the video signal, and doubling the horizontal frequency of the video signal.

7. The apparatus for converting the format of a video signal as claimed in claim 4, wherein the composition ratios of the luminance signal Y and the color difference signals U and V are 4:1:1 or 4:2:2, and are converted into a ratio of 4:4:4.

8. A method of converting decoded video signals and external input video signals R, G, and B, into signals having formats which are required by a signal processor, the method comprising:

converting analog external input video signals into first digital signals comprising R, G and B digital signals converting the R, G, and B digital signals into second digital signals comprising a luminance signal Y and color-difference signals U and V;

converting the composition ratio of the Y, U, and V signals into third digital signals comprising converted Y, U and V signals having a Y:U:V composition ratio that is the same as the composition ratio of the decoded image signals;

receiving the decoded video signals and the third digital signals and selecting and outputting one group of received signals according to a first selection control signal;

doubling the horizontal or vertical frequency of the selected group of received signals;

converting the signals having the doubled horizontal or vertical frequency into ratio-adjusted signals having a composition ratio of the luminance signal and the color-difference signals which is suitable for a signal processor;

receiving the ratio adjusted signals and the second digital signals, and selecting and outputting one group of said signals according to a second selection control signal; and in response to a mode selection signal, generating said first and second selection control signals depending on the horizontal/vertical frequency of the external input signals R, G, and B and on whether the external input signals are to be output.

9. The method of converting the format of a video signal as claimed in claim 8, wherein the first selection control signal controls a selection of the third digital signals in a mode for processing external input signals, and controls the selection of the decoded video signals in a mode for processing internal signals.

10. The method of converting the format of a video signal as claimed in claim 8, wherein the second selection control signal controls a selection of the third digital signals when a mode for processing external input signals is set and when each of the external input signals has either a doubled horizontal or vertical frequency or both a doubled horizontal or vertical frequency, and controls the selection of the ratio-adjusted signals when a mode for processing internal signal is set or when the horizontal or vertical frequency of the external input signals is not doubled in a mode for processing external input signals.

11. The method of converting the format of a video signal as claimed in claim 8, wherein said double scan conversion is performed by inserting a field signal, interpolated using a motion vector, between field signals, and doubling the vertical frequency of a video signal.

12. The method of converting the format of a video signal as claimed in claim 11, wherein the frequency is converted from 60 Hz to 120 Hz in the case of a NTSC signal.

13. The method of converting the format of a video signal as claimed in claim 8, wherein said double scan conversion is performed by inserting a line segment, interpolated using a motion vector, between the horizontal line signals of a field signal, without changing the vertical frequency of the video signal, and doubling the horizontal frequency of the video signal.

14. The method of converting the format of a video signal as claimed in claim 11, wherein the composition ratios of the luminance signal Y and the color difference signals U and V are 4:1:1 or 4:2:2, and are converted into a ratio of 4:4:4.

* * * * *